United States Patent [19]

Gerault et al.

[11] Patent Number: 4,929,308

[45] Date of Patent: May 29, 1990

[54] PAPERMAKING PROCESS AND COMPOSITION FOR THE PRODUCTION OF TRIDIMENSIONAL PRODUCTS CONTAINING THERMOPLASTICS RESIN AND REINFORCING FIBERS

[75] Inventors: Patrice Gerault, Puteaux; Michel Goguelin; Pierre Fredenucci, both of Charavines, all of France

[73] Assignee: Arjomari-Prioux, Paris, France

[21] Appl. No.: 101,076

[22] Filed: Sep. 24, 1987

[30] Foreign Application Priority Data

Sep. 25, 1986 [FR] France .................. 86 13408
Feb. 23, 1987 [FR] France .................. 87 02335

[51] Int. Cl.$^5$ .............................................. D21H 13/36
[52] U.S. Cl. ...................................... 162/145; 162/146; 162/168.1; 162/169; 162/218; 162/221; 162/226; 162/228
[58] Field of Search ............... 162/145, 146, 169, 226, 162/228, 218, 221, 168.1

[56] References Cited

U.S. PATENT DOCUMENTS 4,291,781  9/1981  Niguchi et al. .................. 162/146
4,481,075  11/1984  Dailly et al. ..................... 162/145
4,645,565  2/1987  Vallee et al. .................... 162/145

*Primary Examiner*—Peter Chin
*Attorney, Agent, or Firm*—Bacon & Thomas

[57] ABSTRACT

The process for producing a tridimensional piece from an aqueous suspension containing at least a thermoplastic resin and reinforcing fibers, comprises the following steps:

(a) the elements of the suspension are wet-molded into a preform in a mold, said preform having, in the three dimensions, the general outline of the final piece;
(b) the preform is then at least partly de-watered;
(c) then the preform is pre-heated to a temperature higher than the melting point of the thermoplastic resin;
(d) the preform is then molded under pressure into its final shape in a press heated to a temperature below the melting point of the thermoplastic resin.

13 Claims, 1 Drawing Sheet

PAPERMAKING PROCESS AND COMPOSITION FOR THE PRODUCTION OF TRIDIMENSIONAL PRODUCTS CONTAINING THERMOPLASTICS RESIN AND REINFORCING FIBERS

FIELD OF THE INVENTION

The present invention relates to the production of a tridimensional piece from an aqueous suspension containing at least a thermoplastics resin and reinforcing fibers. By tridimensional piece here is meant a piece which is not substantially plane but which, in space, presents more or less complex shapes, such piece being on the whole constituted by a wall which on average is of relatively small thickness with respect to the wall surface.

BACKGROUND OF THE INVENTION

Materials made up of papermaking sheets are already known, such as for example those described in U.S. Pat. No. 4,645,565 and which, being constituted of a fiber-reinforced thermoplastics matrix, are destined to be transformed by molding-stamping into parts of complex shape.

The advantage of these materials, over other products obtained by conventional processes of the plastics industry, resides in the fact that the reinforcing fibers, being for example, glassfibers, are, during the aqueous dispersion process, all individualized and evenly distributed in the three dimensions.

Such materials however are still found to have certain limitations compared with the ideal material sought by the man skilled in the art:

1. Their conversion into a finished piece, i.e. the step following the production on a papermaking machine implies first of all, a pre-heating at a temperature higher than the melting point of the thermoplastic material. Such pre-heating can be carried out in two ways: either directly, on the necessary quantity of papermaking sheets placed between two heated plates;
or indirectly, with plates obtained by hot-densifying of the above papermaking sheets, said plates being in turn pre-heated by infra-red radiation or hot air ovens.

In both cases, and in particular in the second case, the balance energy is unsatisfactory: in particular, the fact that at the end of the drying, the papermaking sheets have already reached a temperature higher than 100° C., is not exploited. In addition, cutting of the sheets and plates is necessary.

Finally, the pre-heating in an oven imposes the addition of a much higher proportion of thermal stabilizers than in the conventional processes of injection molding.

2. When pre-heated, the quantity of material to be molded is transferred into a colder mold where it is cooled under pressure.

If, as if often the case, and the object with such materials, the molded piece is complex, namely that it comprises ribs, perpendicular planes, whereas it is known to anyone skilled in the art that in order to fill up the mold, the quantity of hot material must be deposited in that mold in the form of a stack of sheets or of plates, the base of the stack having a surface smaller than the mold projected surface, this is in order that during closure of the mold, the hot material flows in all the directions, over all the planes and in the smallest recesses.

However, to obtain such a flowing out of the non-cooled material requires the application of pressures of 100 to 200 bars, so that when the target pieces are large sized, hydraulic presses of several thousands of tons have to be used.

3. Another disadvantage caused by such spreading out of the hot material is that although, contrary to other plastics processes, the average mechanical properties are constant in every part of the finished piece, they remain variable according to the three dimensions since the reinforcing fibers are re-oriented during the spreading.

4. Another limitation, also due to the material flowing during molding, is that, in applications where the fibrous reinforcement could be partly constituted of low-priced cellulose fibers instead of synthetic fibers such as glassfibers, said cellulosic fibers cannot be used because, with their high specific surface area, they would considerably increase the viscosity of the pre-heated material and thus annihilate its flowing capacity.

5. Another problem common to all the compression molding techniques is that certain pieces must have void spaces and that such spaces can only be formed after molding, hence by an additional cutting operation involving loss of material.

6. Finally, with certain applications, it is necessary that one of the faces of the final piece has a special surface finish. To this effect, a surface sheet such as described in U.S. patent application Ser. No. 4,451,539 can be used, but this technique requires, on the one hand, a sheet of larger surface than the laid out surface of the final piece, which involves a loss of material, and on the other hand, and in parallel, a second pre-heating station for that surface sheet.

SUMMARY OF THE INVENTION

It is the object of the present invention to propose a process for manufacturing a tridimensional piece containing thermoplastics resin and reinforcing fibers, showing none of the aforesaid disadvantages.

To this effect, the invention proposes a processing comprising the following steps:

(a) the elements of the suspension are wet-molded into a preform having, in the three dimensions, the general outline of the final piece;

(b) then the preform is at least partly de-watered;

(c) the preform is pre-heated to a temperature higher than the melting point of the thermoplastic resin;

(d) and then the preform is molded under pressure to its final form in a press heated to a temperature below the melting point of the thermoplastics resin.

The wet-molding step can be performed according to the conventional papermaking technique by gravitational draining of the mixture to the target concentration through a porous surface (such as a wire netting or a sieve), with this difference that the porous surface has the shape which is to be given to the preform. Draining is advantageously promoted by a difference of pressure between the two sides of the porous wall, said difference being obtained by extra pressure on the side receiving the suspension and/or depression on the draining side. The molding step can also be performed by anti-gravitational draining from the bottom upwards by applying a correctly selected difference of pressure. Reference can be made to U.S. Pat. No. 4,525,321, the teaching of which is incorporated herein by reference, except that the essentially cellulosic compositions described in said document are replaced by the suspensions according to the present invention.

The de-watering step following the preforming makes it possible to remove an important quanity of the water contained in the molded preform, whether by a mechanical action (squeezing), a hydraulic action (de-pressurizing) or a thermal action (drying), or a combination of all these actions. De-watering can be achieved by suction of the water through the porous preforming mold. It can also be achieved by compression and advantageously reduces by half the thickness of the wall constituting the preform. De-watering can take place in the preforming station proper, or in a separate station after transfer from the preforming station; such transfer is operated, in the case of preforms molded upwardly from the base, for example by moving the preforming mold to the next station, the preform thus remaining "stuck" to the filtering cloth of the mold by applying a depression if necessary. The preform is separated from the cloth by elimination of the depression and/or by the passage of compressed air. The de-watering station has the same shape as the general configuration of the preform, or at least of one face thereof, and further comprises at least a porous or simply perforated surface for the removal of the water; optionally, said porous surface can be that used at the preforming station. In the case of de-watering by compression, a supple membrane is advantageously used and applied over the upper part of the preform, for example under a pressure of six bars.

The de-watering step preferably comprises a drying operation at around 90° C. to 120° C. This drying operation can be performed in an oven: to this effect the preform is transferred from the first de-watering station to the oven; the bonding conferred by the de-watering under compression enables the transfer of the preform by suction cups or any other means. It is also possible, when the preform is sufficiently porous, to perform a drying operation by causing a hot gaseous fluid, generally hot air, to flow through the preform; this step can optionally be carried out in the same porous support as that of the de-watering station. If this drying method is selected, the pressing in the preceding de-watering step should preferably be limited in order to retain a good porosity of the material. Other drying methods can also be used, such as contact-drying in a mold, infra-red or high frequency drying, as well as combinations of these different methods.

According to one important aspect of the invention, the preform is then pre-heated to a temperature higher than the melting point of the thermoplastic resin, in order to soften the preform for subsequent pressing. For example, pre-heating to a temperature of between 210° and 220° C. is suitable for a polypropylene resin. In this case, reference is made to a pre-heating because it precedes the step of molding under pressure. Drying may either be incorporated to the pre-heating or precede it. Various suitable pre-heating means are contact-heating in a heating mold of suitable shape, high frequency or infrared heating, or a passage in a hot air blowing oven, or in a hot air-through oven, or any combination of said processes.

Then, the preform is transferred between the plates of a press heated to a temperature high enough for the final molding of the piece, which piece is then merely extracted from the press. To this effect, the final molding temperature should be clearly below the melting point of the thermoplastics material so as to enable the finished piece to be handled without deformation when out of the mold. The temperature may be between 70° and 80° C. for a piece having a matrix in polypropylene.

Contrary to the high pressures which may be necessary for the molding-stamping of sheets such as described in U.S. Pat. No. 4,645,565 (i.e. 100 bars), the pressure, according to the invention, is only of about thirty bars.

It is clear that the process according to the invention differs from the process known from U.S. Pat. No. 4,525,321 cited hereinabove, not only by the nature of the compositions used but also by the fact that this document overlooks the pre-heating step and on the contrary imposes a hot-molding operation at temperatures generally higher than those used in the present invention: preferred temperatures are between 100° and 190° C. and they are particularly important for cross-linking the thermosetting resins generally used for permanently binding the wood fibers.

It is possible, with the process according to the invention, to drain, inside the preforming mold, a suspension of which the composition varies gradually or in stages. It is particularly advantageous to drain, one after the other, and one on top of the other, a first composition designed to form the apparent surface of the finished piece, and a second composition, designed to form the structural layer of the finished piece. The resulting preform is then subjected to the following unchanged steps of the described process.

The preceding solution is the preferred one, but an alternative could be to prepare two separate preforms, one for the surface and one for the structural reinforcement, and then to re-group these preforms in a subsequent step of the process, either during the compression-squeezing step or else during the final molding.

The invention further relates to compositions to be used, especially a process for wet-molding of a preform having, in the three dimensions, the general outlines of the finished piece, and more particularly the process of the invention. Indeed, although the compositions taught by U.S. Pat. No. 4,645,565 are generally satisfactory for carrying out the process, other compositions have been found to be more suited to said process.

In general, the suspensions designed to form the structural part of the final piece have the following composition (in percent by weight):

| Binding fibers | 5–13 |
| Reinforcing fibers | 26–34 |
| Thermoplastics resins | 40–60 |
| Fillers | 0–40 |

By binding fibers is meant fibers such as cellulose fibers or fibrils of polyolefin pulp (see U.S. Pat. No. 2,481,707), which ensure a certain cohesion of the other elements of the preparation.

By reinforcing fibers is meant inorganic fibers (glass-fibers, carbon fibers, ceramic fibers, rock wool, . . . ), metallic fibers (stainless steel, . . . ) or certain organic synthetic fibers having a high melting point (polyamide, aromatic, polyester or other fibers).

The fibers used can reach up to 30 mm in length.

It is possible, in the same composition, to have fibers of different natures and/or of different lengths and/or of different diameters. However, glassfibers constitute the preferred reinforcement. The proportion of reinforcing fibers is dependent on the characteristics required for the final product, and the range of 26–34% corresponds to preferred applications particularly in the motorcar equipment industry.

By thermoplastics resin is meant a resin or a mixture of resins which are mutually compatible, among polyolefins, polyamides, polyesters, polyphenylene ethers and any other thermoplastics resins.

This thermoplastics matrix is preferably brought in powder form, the mean granulometry of such powder being less than 800 microns. It can also be entirely or partly in the form of fibers cut to a length of preferably less than 6 mm. The selected proportion of 40–60% produces an excellent molding of the piece in the final step.

Finally, the preform compositions according to the invention can also contain inorganic fillers but preferably, the overall proportion by weight of infusible material (reinforcing fibers and fillers) does not exceed 60% of the composition so that said composition remains readily moldable into the final piece.

Obviously, papermaking additives are known to anyone skilled in the art, such as for example dispersing, water-repellent, binding and flocculating agents, can also be added to the composition, if necessary. If inorganic fillers are added or if the thermoplastics powder is of very fine granulometry (less than 100 microns for example), it will be possible, depending on the mesh size of the preforming cloth, to add a suitable retention agent at the head of the machine.

Plastic additives, such as thermal stabilizers, dyes, plasticizers, agents for improving the fiber-resin interface and any other agents known to anyone skilled in the art, can also be added in order to obtain the required plastic properties.

According to one particularly unexpected aspect of the invention, the target compositions have a particularly low content of binding fibers: between 5 and 13%, this being particularly interesting insofar as these fibers generally bring no advantage to the final product. The polyolefin pulps are, on the other hand, very expensive and they are advantageously replaced, either entirely or partly, with cellulosic fibers which, in the small proportions considered, do not substantially affect the moldability of the product during the final stage of the process (especially as the intermediate passage through a preform makes it possible to reduce the deformations imposed during the final molding in order for the finished piece to reach its final configuration).

The presence of reinforcing fibers such as glassfibers gives a surface finish which may not be the final aspect wanted for the finished piece or for the nature of the treatments to be subsequently carried out (painting, etc.). It is advantageous in this case to position, according to the above described process, a surface composition containing substantially no reinforcing fibers, and being composed as follows (in percent by weight):

| Binding fibers | 11–20 |
| Thermoplastic resins | 40–89 |
| Fillers | 0–40 |

The advantage of the presence of fillers in the surface composition is in particular that it contributes to improving the surface finish by filling up the pores.

In general, the surface composition will be used in the proportion of 5 to 20% by weight of the reinforcing composition.

For gsm substances of final product between 2500 and 3000 g/m2, the actual gsm substance of the surface composition is preferably 250 to 300 g/m2.

Of course, it is also possible according to the invention, to use surface compositions according to the teaching of U.S. Pat. No. 4,451,539.

BRIEF DESCRIPTION OF THE DRAWINGS

The invention will be more readily understood on reading the following description with reference to the accompanying drawings, in which.

DETAILED DESCRIPTION OF THE INVENTION

Figure 1:
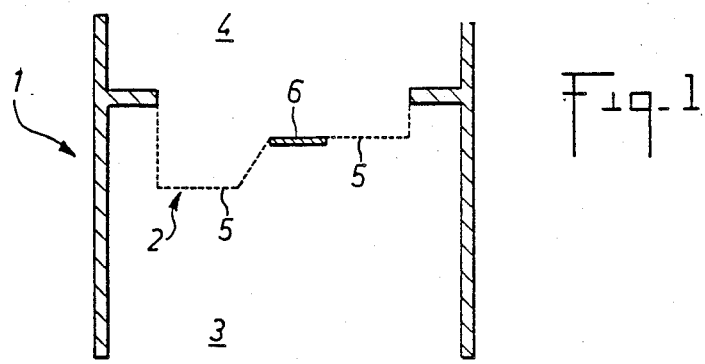
FIG. 1 is a diagrammatical cross-section of a mold usable according to the process of the invention.

Referring first to FIG. 1, this shows the mold 1 in which is carried out the forming operation. Said mold 1 consists in a porous preform support 2, separating a lower chamber 3 from an upper chamber 4. The porous support has, in the three dimensions, substantially the general geometry of the final piece. It is essentially composed of porous metal parts 5 designed to let through the water and to retain the material constituting the preform. The support can comprise non-porous parts 6, in which the material will not settle, which will entail corresponding void spaces in the preform. The lower chamber 3 is connected via means not shown to one or more chests containing aqueous suspensions. The upper chamber 4 is connected to depressurizing means (not shown).

The aqueous dispersion of the various elements composing the final piece (binding fibers, reinforcing fibers, thermoplastics resin, papermaking and plastic additives) is admitted into lower chamber 3 where it is drained by suction of the water under depression through porous parts 5 of the support. Chamber 3 is designed so that the draining power is constant in every point of the porous support 5. As a result, the displacement of the material necessary for the final molding is very small so that high pressures are no longer necessary, cellulosic fibers can be used and the non-re-oriented reinforcing fibers retain, inside the final piece, the perfect distribution which they had after the draining, hence constant properties in the three dimensions. Moreover, the choice of a depression from the base towards the top enables the material to deposit on the porous support without the gravity imposing preferential settling zones.

Figure 2:
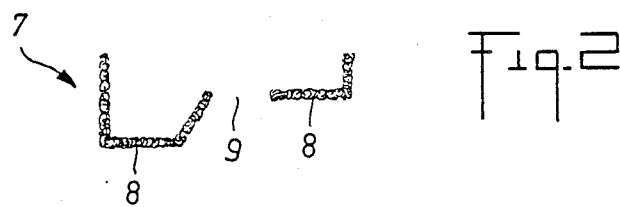
FIG. 2 is a diagrammatical cross-section of the preform obtained from the form according to FIG. 1.

The preform 7 obtained after draining is as illustrated in FIG. 2, with its solid parts 8 and its void spaces 9, after which it is squeezed.

When de-watered, the preform 7 is heated to a temperature higher than the contact temperature inside a mold of adapted shape. As a variant, the preform can be placed on an adequate porous support in order to be run through by an air stream heated to a temperature higher than the melting point of the thermoplastic matrix.

Figure 3:
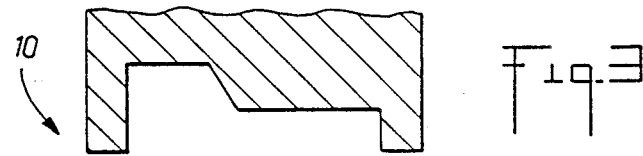
FIG. 3 is a diagrammatical cross-section of a mold used for densifying the preform according to FIG. 2.

In the last step, the hot preform 7 is detached from its support and transferred into mold 10 (FIG. 3) at a temperature notably less than preheating temperature, in which mold 10 said preform takes on, by densification and cooling under pressure, the final form of the piece.

The initial porous support and any intermediate porous supports used must have the same general shape as the mold so that there is no tearing of the surface layer during the molding.

The following examples are given, non restrictively, to illustrate the invention.

Three suspensions were prepared according to the compositions given in the accompanying Table, by mixing glassfibers, cellulosic fibers, the synthetic pulp, the polypropylene powder and an antioxidant, with water containing a cationic dispersing agent with a fatty acid content.

The concentration of these mixtures when they reach the preforming mold is of course dependent on the target gsm substance.

The mixture was molded into a preform having a hat configuration. The squeezed and dried preform was then pre-heated to 210° C. and pressed for one minute under 30 bars at 80° C. The good mechanical properties of the molded products are given in the accompanying Table.

By way of illustration, the exact complete composition of Example 2 was

| | | |
|---|---|---|
| Water | 76 | liters |
| dispersing agent "Cartaspers DS1" ® sold by SANDOZ | 289 | g |
| paper pulp "Cariboo" | 340 | g |
| Glassfibers "R18DX9" ® sold by OWENS CORNING | 2430 | g |
| Synthetic pulp "Pulpex EA" ® sold by HERCULES | 430 | g |
| Polypropylene powder "GY 545M" ® sold by IMPERIAL CHEMICAL INDUSTRIES (ICI) | 4850 | g |

Concentration was 5.75% and an antioxidizing agent "TBM 6T" ® sold by Societé Francaise d'Organosynthése in a proportion of 0.5% by weight of dry materials.

Attempts have also been made, with success, in Example 2, to add a surface composition as follows:

| | |
|---|---|
| Cellulose fibers | 11.4% |
| "Pulpex EA" ® synthetic pulp | 7.2% |
| "GY 545M" ® polypropylene powder | 81.4% |

TABLE

| | Example 1 | Example 2 | Example 3 |
|---|---|---|---|
| Raw materials | | | |
| Glassfibers (a) | 26% | 30.2% | 34% |
| Cellulosic fibers (b) | 5.4% | 4.3% | 4% |
| Polyethylene pulp (c) | 4.6% | 5.3% | 6% |
| Antioxidizing agent | s.q. | s.q. | s.q. |
| Dispersing agent | s.q. | s.q. | s.q. |
| Properties of the molded propduct | | | |
| Density | 1 | 1.05 | 1.12 |
| Modulus in flexure (MPa) | 3264 | 3400 | 3502 |
| Bending stress (MPa) | 75 | 78 | 79 |
| Tensile stress (MPa) | 44 | 47 | 50 |
| Ashes (%) | 24 | 29 | 32 |

(a) Glassfibers of length 6 mm and diameter 11 microns.
(b) Long fibers of a (resinous) paper pulp refined to 50° SR
(c) Polyethylene pulp of specific surface area 10 m2/g
(d) Powder of mean granulometry: 200 to 350 microns.
s.q. sufficient quantity.

What is claimed is:

1. A process for producing a tridimensional piece from an aqueous suspension containing at least a thermoplastic resin and reinforcing fibers, comprising the following successive steps:
   (a) preparing a suspension consisting essentially of the following composition (in % by weight):

| | |
|---|---|
| Binding fibers | 5–13 |
| Reinforcing fibers | 26–34 |
| Thermoplastics resin | 40–60 |
| Fillers | 0–40 |

(b) wet-molding the elements of the suspension into a preform having, in the three dimensions, the general outline of the final piece in a preforming station before de-watering;
   (c) at least partly de-watering the preform;
   (d) pre-heating said preform to a temperature higher than the melting point of the thermoplastics resin; and
   (e) molding said preform under pressure into its final shape in a press heated to a temperature below the melting point of the thermoplastics resin, wherein said pressure is less than 100 bars.

2. Process as claimed in claim 1, wherein the de-watering step is carried out by compression.

3. Process as claimed in claim 1, wherein the de-watering step is carried out at the preforming station.

4. Process as claimed in claim 1, wherein the de-watering step includes a drying operation.

5. Process as claimed in claim 4, wherein the drying step is incorporated in the pre-heating step.

6. Process as claimed in claim 1, wherein the pre-heating step is obtained with a stream of hot gaseous fluid.

7. A process as claimed in claim 1, wherein the pressure is less than 30 bars.

8. A process for producing a tridimensional piece from an aqueous suspension containing at least a thermoplastics resin and reinforcing fibers comprising the following successive steps:
   (a) preparing a suspension consisting essentially of the following composition (in % by weight):
      5 to 13 binding fibers selected from the group consisting of cellulosic fibers and fibrils of polyolefin pulp;
      26 to 34 reinforcing fibers selected from the group consisting of glass fibers, carbon fibers, ceramic fibers, rock wool, metallic fibers, and high melting organic synthetic fibers;
      40 to 60 thermoplastics resin selected from the group consisting of polyolefin, polyamides, polyesters and polyethylene ethers; and
      0 to 40 fillers;
   (b) wet-molding the elements of the suspension into a preform having, in the three dimensions, the general outline of the final piece in a pre-forming station before de-watering;
   (c) at least partly de-watering the preform;
   (d) pre-heating said preform to a temperature higher than the melting point of the thermoplastics resin; and
   (e) molding said preform under pressure into its final shape in a press heated to a temperature below the melting point of the thermoplastics resin, wherein said pressure is less than 100 bars.

9. A process as claimed in claim 8, wherein the pressure is less than 30 bars.

10. A process for producing a tridimensional piece from an aqueous suspension containing at least a thermoplastics resin and reinforcing fibers, wherein said process comprises the following successive steps:
   (a) preparing a first suspension consisting essentially of the following composition (in % by weight):

| | |
|---|---|
| Binding fibers | 5–13 |
| Reinforcing fibers | 26–34 |
| Thermoplastics resin | 40–60 |
| Fillers | 0–40 |

(b) wet-molding the elements of the first suspension into a first three-dimensional preform having the general outline of the final piece before de-watering;

(c) preparing a second suspension consisting essentially of the following composition (in % by weight):

| | |
|---|---|
| Binding resin | 11–20 |
| Thermoplastics resin | 40–89 |
| Fillers | 0–40 |

(d) wet-molding the elements of the second suspension into a second three-dimensional preform having the general outline of the final piece before de-watering;

(e) at least partly de-watering the first and second preforms;

(f) combining said first and second preforms so that the first preform will constitute the structural part of the final piece and the second preform will constitute the surface part of the final piece;

(g) pre-heating said preforms to a temperature higher than the melting point of the thermoplastics resin; and (h) molding said preforms under pressure into the final three-dimensional piece in a press heated to a temperature below the melting point of the thermoplastics resin wherein said pressure is less than 100 bars.

11. A process as claimed in claim 10, wherein the pressure is less than 30 bars.

12. A process for producing a tridimensional piece from an aqueous suspension containing at least a thermoplastics resin and reinforcing fibers, comprising the following successive steps:

(a) preparing the suspension consisting essentially of the following composition (in % by weight):

5 to 13 binding cellulosic fibers having a length up to 30 millimeters;

26 to 34 reinforcing glass fibers having a length up to 30 millimeters;

40 to 60 polypropylene powder having a mean granulometry less than 800 microns; and 0 to 40 inorganic fillers, the overall proportion by weight of reinforcing glass fibers and fillers not exceeding 60% of the composition;

(b) wet-molding the elements of the suspension into a three-dimensional preform having the general outline of the final piece before de-watering;

(c) a least partly de-watering the preform;

(d) pre-heating said preform to a temperature ranging between 210° and 220° C.; and (e) molding said preform under pressure into its final shape in a press heated to a temperature ranging between 70° and 80° C. wherein said pressure is less than 100 bars.

13. A process as claimed in claim 12, wherein the pressure is less than 30 bars.

* * * * *